United States Patent [19]
Ramsower

[11] 3,951,214
[45] Apr. 20, 1976

[54] APPARATUS FOR REMOVABLY SUPPORTING FARM TOOL BARS

[76] Inventor: Vernon Ramsower, Rte. 3, Plainview, Tex. 79072

[22] Filed: Feb. 7, 1975

[21] Appl. No.: 548,090

Related U.S. Application Data

[63] Continuation-in-part of Ser. No. 332,872, Feb. 15, 1973, abandoned.

[52] U.S. Cl. .............................. 172/274; 172/697; 172/776
[51] Int. Cl.² ....................................... A01B 51/00
[58] Field of Search .......... 172/697, 776, 687, 763, 172/245, 253, 451, 413, 439, 446, 272, 274; 70/18

[56] References Cited
UNITED STATES PATENTS

| | | |
|---|---|---|
| 2,119,217 | 5/1938 | Rocchi .................................. 70/61 |
| 3,077,231 | 2/1963 | Hamilton ....................... 172/451 UX |
| 3,239,015 | 3/1966 | Scott ................................ 172/776 X |
| 3,403,737 | 10/1968 | Byrd ................................ 172/451 X |
| 3,726,346 | 4/1973 | Thompson et al. ............... 172/776 X |

Primary Examiner—Stephen C. Pellegrino
Attorney, Agent, or Firm—Wendell Coffee

[57] ABSTRACT

The tool bars carrying plows are removably attached to the farm tractor by two or more rearwardly extending support arms. The support arms are attached to a frame connected to the standard three-point power lift attachment of the farm tractor. Locking bars lock the tool bars to the support arms.

16 Claims, 11 Drawing Figures

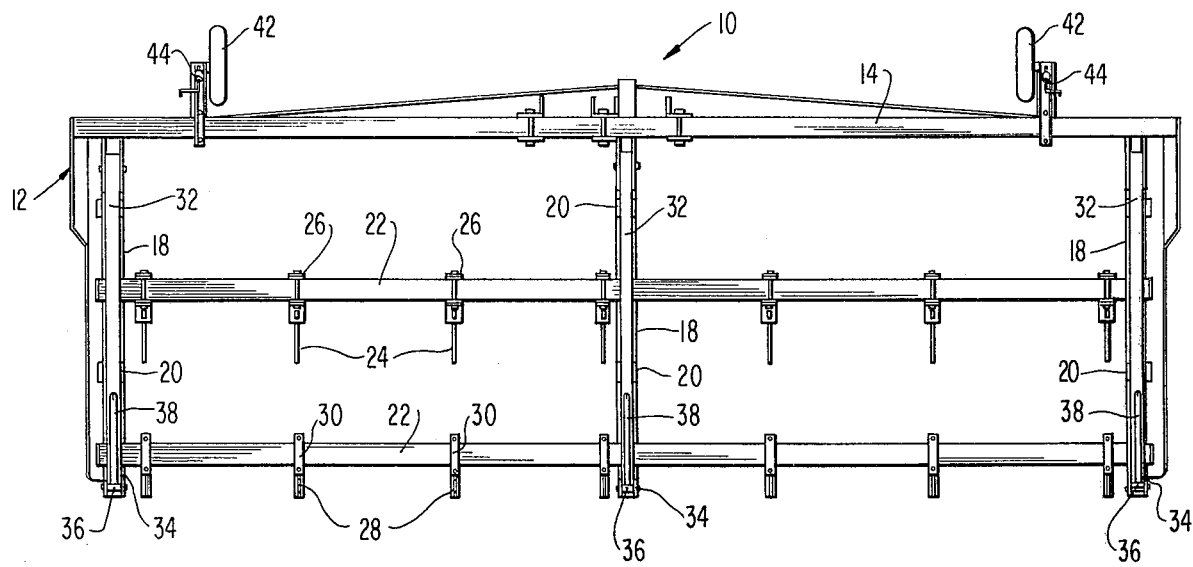
FIG. 3
FIG. 4
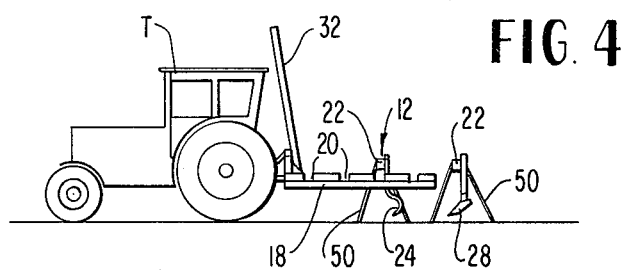
FIG. 5
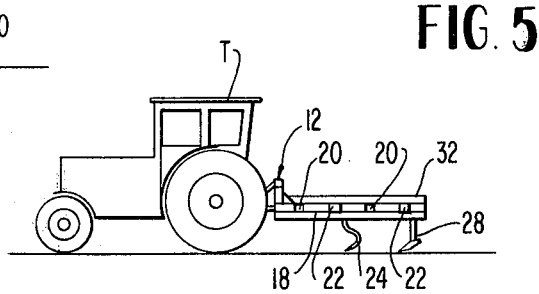
FIG. 6
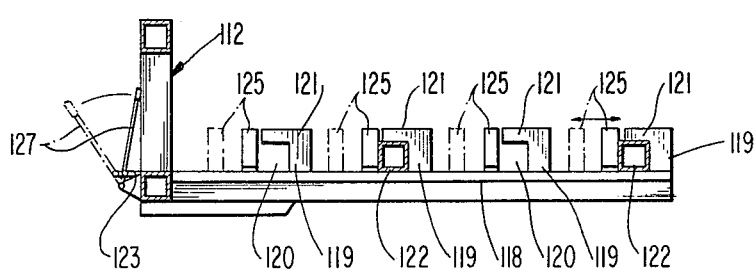
FIG. 7
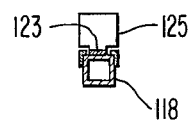

3,951,214

APPARATUS FOR REMOVABLY SUPPORTING FARM TOOL BARS

CROSS-REFERENCE TO RELATED APPLICATIONS

This application is a continuation-in-part of application Ser. No. 332,872, filed Feb. 15, 1973 now abandoned.

BACKGROUND OF THE INVENTION

In the past and at the present time, farm tools such as cultivators, planters, listers, etc., have been removably or fixedly mounted on closed supporting frames attached to a farm vehicle, such as a tractor. These supporting frames have generally comprised one or more laterally extending tool bars fixedly secured to the frame on which the farm tools are mounted in a predetermined spaced relation. With such a supporting frame, if the farmer desires to change any of the farm tools mounted on the fixed tool bars of the frame, each farm tool has to be removed from its support bar and replaced with a different farm tool in a very tedious and time consuming operation.

A second disadvantage of the closed supporting frames utilized previously for supporting farm tools is that such frames have been expensive and have lacked versatility. In such frames, for example, the number and spacing of of the tool bars for the farm tools is fixed since these bars are rigidly attached to the supporting frame. The spacing of laterally extending rows of farm tools, therefore, could not be varied by the farmer in view of the fixed mounting of the tool bars. Because of this lack of versatility, the farmer, in many cases, has to purchase more than one supporting frame at considerable expense.

It will be readily seen, therefore, that a need has arisen for an apparatus for supporting farm tools wherein the farm tools may be readily changed or replaced and the spacing of rows of farm tools may be varied. The apparatus of the present invention fulfills this need in that it is not subject to any of the disadvantages of the previously utilized supporting frames, as hereinbefore described, and possesses many advantages not possessed by the previously and presently used support apparatus of this type.

SUMMARY OF THE INVENTION

The present invention comprises apparatus for removably supporting elongated tool bars on which farm tools may be removably mounted in any desired or predetermined spaced relation. This apparatus comprises a frame adapted to be secured to a farm vehicle, such as a tractor, comprising a plurality of rearwardly extending, laterally spaced support arms. Each of the support arms has at least one longitudinally spaced recessed portion that is in lateral alignment with corresponding recessed portion in the other arms. Each of the recessed portions in each arm is adapted to removably receive at least one laterally extending tool bar therein. In this manner, the recesses in each of the arms can removably support a plurality of such tool bars in rearwardly or longitudinally spaced relation.

Each tool bar preferably is of a length that is approximately the same as or greater than the distance between the rearwardly extending support arm on one side of the frame and the rearwardly extending support arm at the other side of the frame so as to extend completely across the frame. The tool bars are of a cross sectional shape that is adapted to receive any suitable type of removable clamping means for the purpose of securing farm tools of any desired type to the support bars. In normal practice, farm tools of the same type are removably mounted in laterally spaced relation on each tool bar.

Any suitable type of releasable locking means are provided on the supporting frame for retaining the tool bars in the recessed portions of the rearwardly extending support arms. In one embodiment of this invention, the locking means comprises a locking bar removably mounted on the frame adjacent each rearwardly extending support arm and being movably between a locking position covering the recessed portions of the support arm and an unlocking position removed from the recessed portions of the support arm. When the locking means is in an unlocked position, tool bars having different types of farm tools mounted thereon may be readily mounted within or removed from the recessed portions of the rearwardly extending support arms. In this manner, a row of farm tools may be replaced without the necessity of removing each farm tool from its tool bar. Also, the longitudinal spacing of the tool bars may be easily varied by the choice of the recessed portions of each support arm used for supporting these bars.

Since the rear portion of the supporting frame is open, the rearwardly extending support arms thereof may be readily moved under tool bars having different types of farm tools mounted thereon so as to enable these bars to be readily mounted on or removed from the arms of the supporting frame. Preferably, the front portion of the frame is provided with laterally spaced gauge wheels or the like for the purpose of insuring substantially uniform ground engagement by the farm tools mounted on the frame in laterally spaced relation, regardless of the grade of the land being serviced.

BRIEF DESCRIPTION OF THE DRAWINGS

FIG. 3 is a plan view of the apparatus shown in FIG. 1.

FIG. 4 is a reduced side elevational view, with parts omitted, showing the apparatus of the present invention mounted on a farm vehicle and disposed under a farm tool bar to be mounted on or removed therefrom;

FIG. 5 is a view similar to FIG. 4, showing the farm tool bars mounted on the apparatus;

FIG. 6 is a side elevational view, with parts broken away, of a modified form of locking means for the apparatus shown in FIGS. 1 through 5;

FIG. 7 is an end elevational view of the apparatus shown in FIG. 6;

DESCRIPTION OF THE PREFERRED EMBODIMENTS

Figure 1:
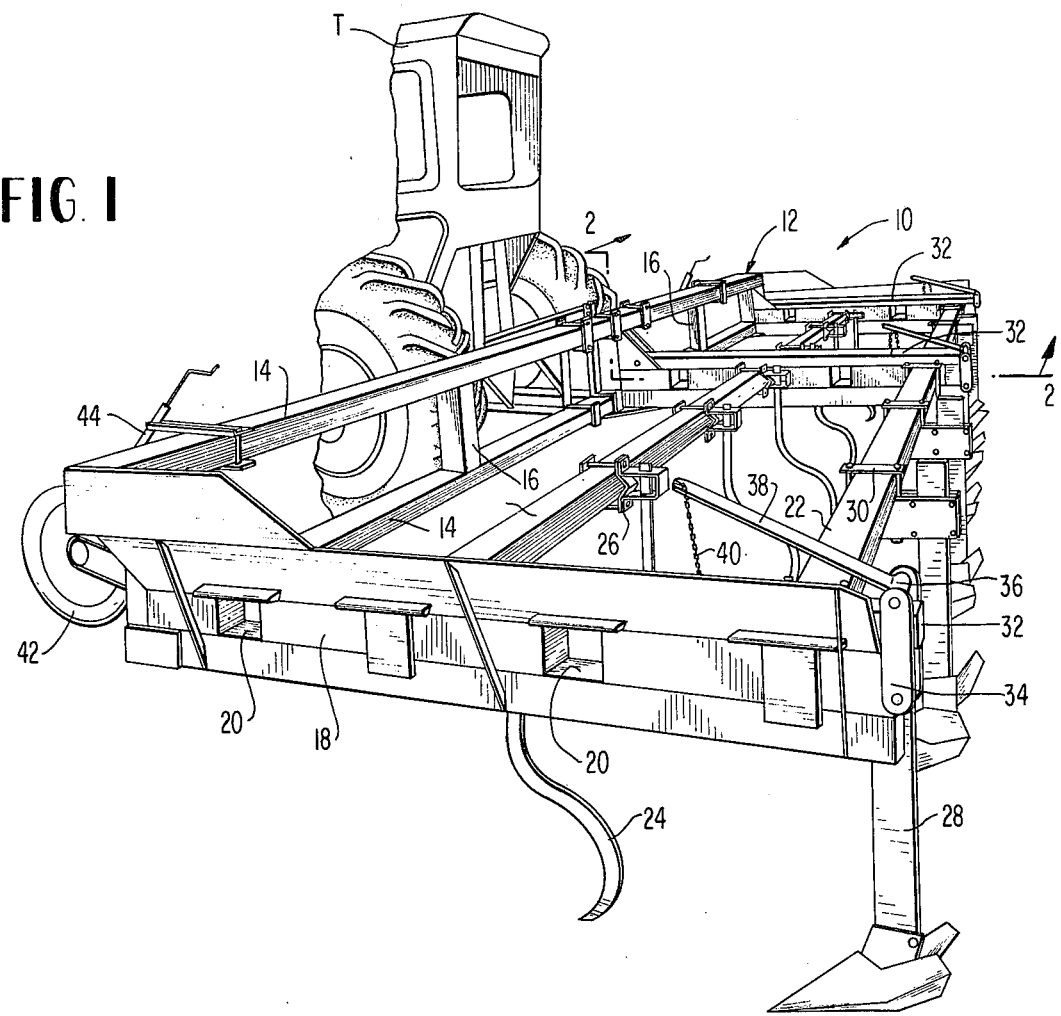
FIG. 1 is a perspective view of apparatus for removably supporting farm tool bars constructed in accordance with the principles of the present invention.
Figure 2:
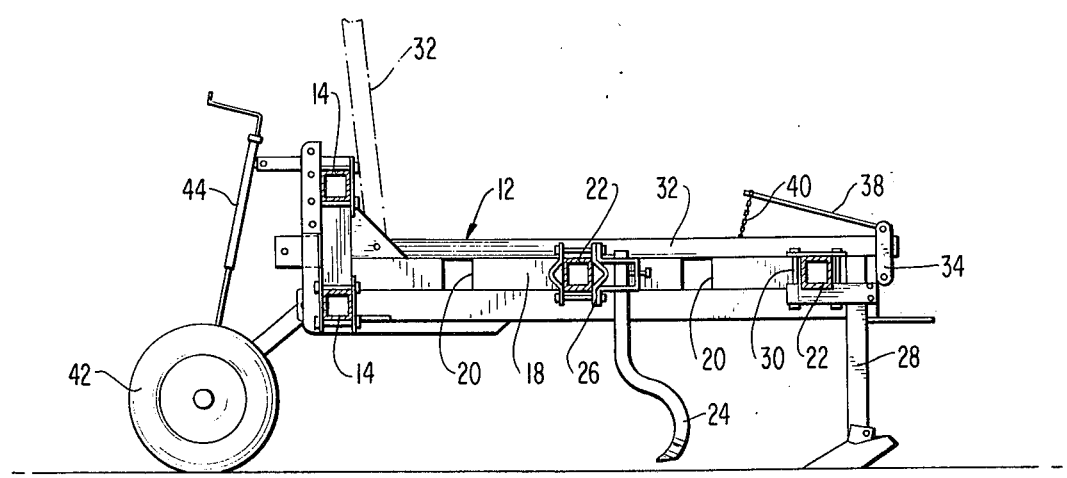
FIG. 2 is a side elevational view of the apparatus shown in FIG. 1.

As shown in FIGS. 1 through 3, the apparatus 10 of the present invention generally comprises a frame 12 adapted to be attached in any suitable manner to a farm vehicle such as a tractor T. As an illustrative example, the forward portion of the frame 12 can be mounted on the normal 3-point hitch of a tractor in such a manner that the frame would be movable upwardly and downwardly by the tractor in any suitable or conventional manner.

The frame 12 comprises a laterally extending front frame portion having a pair of vertically spaced, elongated support members 14 rigidly connected by a plurality of vertically extending connecting members 16. A plurality of rearwardly extending, substantially parallel support arms 18 are rigidly connected at their forward ends only to the support members 14 and are provided with a plurality of upwardly facing recessed portions 20 in the upper side thereof. The recessed portions 20 in each support arm 18 are substantially laterally aligned with corresponding recessed portions in the other support arms.

In each support arm 18, the recessed portions 20 are of a suitable size and cross-sectional shape so as to removably and slidably receive a support or tool bar 22 therein, in the manner shown in FIGS. 1 through 3. In this manner, tool bars 22 of a length generally corresponding to the lateral extend of the frame 12 can be received in corresponding recessed portions 20 of the rearwardly extending support arms 18 and thus can be removably supported on the support arms. The side walls of each recessed portion 20 preferably are tapered upwardly and outwardly to a slight extent so as to facilitate the positioning of the tool bars 22 in the recessed portions 20 and also to provide for a wedging action as the tool bars 22 are fully inserted in the recessed portions 20.

The tool bars 22 are adapted to removably support a plurality of farm tools, such as cultivators, planters, listers, or other earthworking tools in any suitable or predetermined laterally spaced relation. As shown in FIGS. 1 through 3, farm or earthworking tools 24 of one type may be mounted by any suitable type of removably clamping means 26 to one of the tool bars 22, while farm or earthworking tools 28 of a second type may be removably mounted by any suitable type of removable clamping means 30 on a second tool bar 22 rearwardly spaced from the first tool bar. Through the use of the apparatus 10 of the present invention, therefore, tool bars 22 having different types of farm tools mounted thereon in any suitable spaced relationship may be mounted in any desired recessed portions 20 of the support arms 18 for the purpose of performing desired farming functions. This can be accomplished by merely removing or repositioning tool bars 22 on the support arms 18, without the necessity of having to remove each of the farm tools from the support bars.

A suitable type of locking or retaining means is utilized for retaining the tool bars 22 in the recessed portions 20 of the support arms 18. As an illustrative example, a locking bar 32 may be pivotally supported on the frame 12 above each of the support arms 18, in the manner shown in FIGS. 1 through 3. Each of the locking bars 32 is pivotally movable, either manually or by suitable power means (not shown), between an open position removed from the recessed portions 20, as shown in broken lines in FIG. 2, and a locking or closed position in engagement with the adjacent support arm 18 so as to cover the recessed portions 20 and retain the tool bars 22 therein, as shown in solid lines in FIG. 2. As seen, the locking bar 32 is about the same length as the support arm 18.

Any suitable type of locking means may be utilized for the purpose of locking the locking bars 32 in the closed position for the purpose of positively retaining the tool bars 22 in the recessed portions 20. As an illustrative example, FIGS. 1 through 3 disclose a link 34 pivotally mounted on the rear end of each support arm 18 and being pivotally movable over the rear end of the adjacent locking bar 32 when it is in the locking or closed position. Each link 34 is provided with an eccentric rotatable camming pin 36 at its upper or outer end which is adapted to engage the upper surface of the locking bar 32 and cam or urge it downwardly into a locking or closed position. To facilitate the rotation of the eccentric pin 36 to a camming or locking position, it may be provided with a handle 38 and a chain 40 attachable to the adjacent support arm 18 for the purpose of maintaining the handle 38 in the locking position.

For the purpose of maintaining a substantially uniform depth of cut of the farm tools 24 and 28 in the ground, as the tractor T and frame 12 travel over different types of grades, any suitable type of gauge wheels 42 may be mounted in spaced relation on the front supporting members 14. Each of the gauge wheels 42 may be provided with any suitable type of adjusting means 44 for varying the vertical position of the gauge wheels.

In the use of the apparatus 10 of the present invention, tool bars 22 having any suitable or desired type of farm tools mounted thereon may be easily mounted in the recessed portions 20 of the support arms 18, and the spacing between the tool bars 22 may be varied, depending on the recessed portions 20 in which the bars are mounted. As shown in FIGS. 1 through 3, the spacing between the tool bars 22 can be increased by mounting them in every other recessed portion 20 of each support arm 18 rather than mounting tool bars in each recessed portion.

As shown in FIGS. 4 and 5, since the rear portion of the frame 12 with the support arms 18 is open, the rearwardly extending support arms 18 may be readily moved under tool bars 22 having farm tools 24 and 28 mounted thereon by merely lowering the frame 12 on the tractor T and moving the tractor rearwardly until the support arms 18 are positioned under the tool bars 22, with the tool bars aligned with the desired recessed portions 20. Thereafter, frame 12 is lifted by the tractor T so as to receive the tool bars 22 in the recessed portions 20, and the locking bars 32 are then moved downwardly to the locking position and are locked by the links 34 to positively retain the locking bars 22 therein, as shown in FIG. 5. Depending on the type of farm tool mounted on the tool bars 22, they may have to be supported by a temporary support or frame 50, as shown in FIG. 4, so as to maintain them in the proper position to be received within the recessed portions 20 of the support arms 18.

When it is desired to remove or replace tool bars 22 on the frame 12, the locking bars 32 are pivoted upwardly to their unlocking positions and the frame 12 is lowered so as to remove the tool bars 22 from the recessed portions 20 of the support arms 18. The frame 12 is then moved forwardly by the tractor T until the support arms 18 clear the removed tool bars 22.

FIGS. 6 and 7 disclosed a modified form of locking means for retaining the tool bars 22 on the support arms 18. In this modification, each of the rearwardly extending support arms 118 secured to the frame 112 comprises a plurality of rearwardly or longitudinally spaced upstanding members 119 fixedly mounted thereon. Each of the members 119 comprises a forwardly extending flange portion 121 so as to define a recess 120 adapted to receive a farm tool bar 122 therein.

In order to lock the tool bars 122 in the recesses 120, a slide locking bar or member 123 is slidably mounted in a longitudinal channel in each support arm 118 and has a plurality of upstanding locking members 125 secured thereto. The slide member 123 may be selectively moved forwardly or rearwardly along each support arm 118 by any suitable means such as a handle 127 pivotally mounted on the frame 112. In this manner, a farm tool 122 received within the recess 120 defined by the upstanding member 119 and flange portion 121 thereof, may be locked to the support arm 118 by moving the slide member 123 rearwardly to thereby move the adjacent upstanding locking member 125 to the solid line position shown in FIG. 6. When it is desired to release the farm tool bar 122 from the support arm 118, the slide member 123 is moved forwardly to thereby move the adjacent locking member 125 from the solid line to the broken line position shown in FIG. 6.

Referring to FIGS. 8 through 11, there may be seen yet another embodiment of this invention. In this embodiment, the apparatus 210 is adapted to pick up a tool bar assembly 221. The tool bar assembly may be composed of a single tool bar 222 or two or three tool bars 222 which are connected together to form a single unit as shown particularly in FIGS. 8 and 11. If only a single tool bar 222 is to be used, it is necessary to weld a spacer onto the tool bar in a position to fit the support arms 218. Inasmuch as this would be obvious to ordinary farm mechanics, it has not been illustrated in the drawings.

Figure 8:
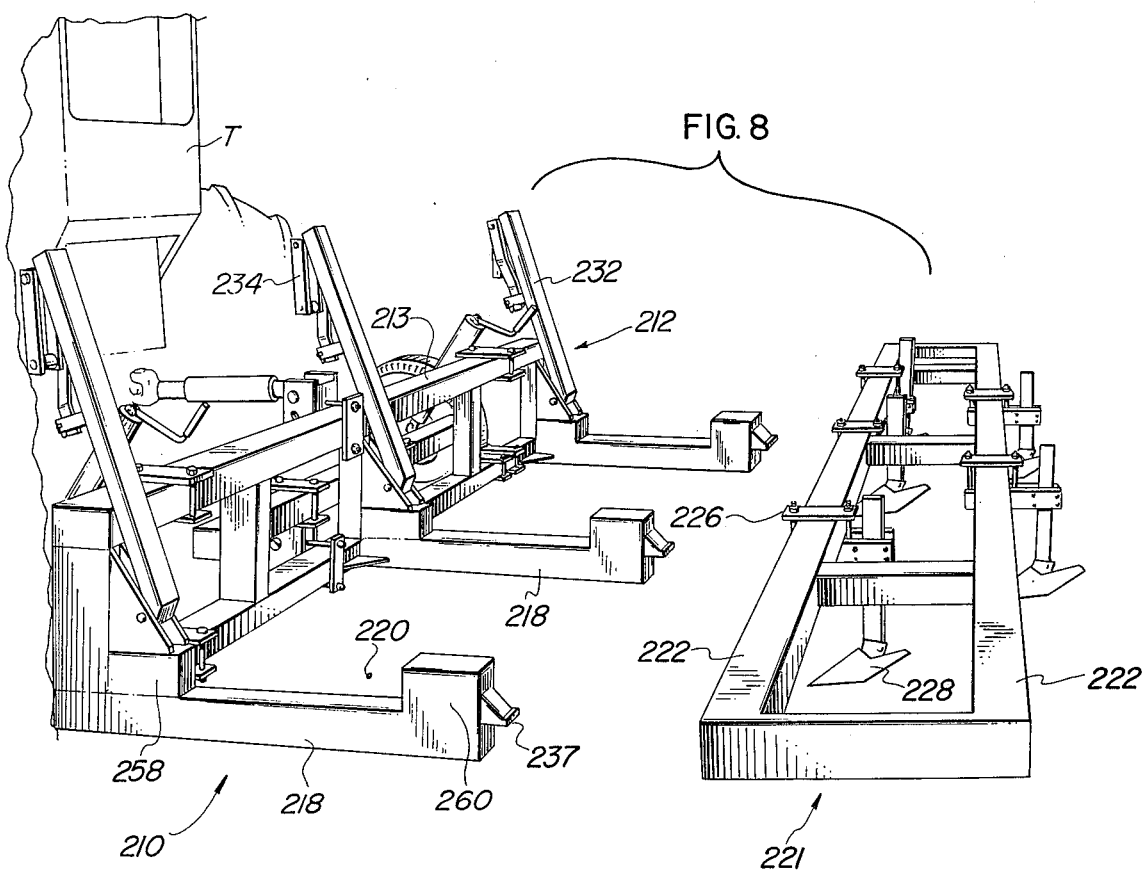
FIG. 8 is a perspective view of another embodiment of an apparatus for removably supporting farm tool bars with the tool bars to be supported detached from the supporting apparatus, in accordance with the principles of the present invention.
Figure 9:
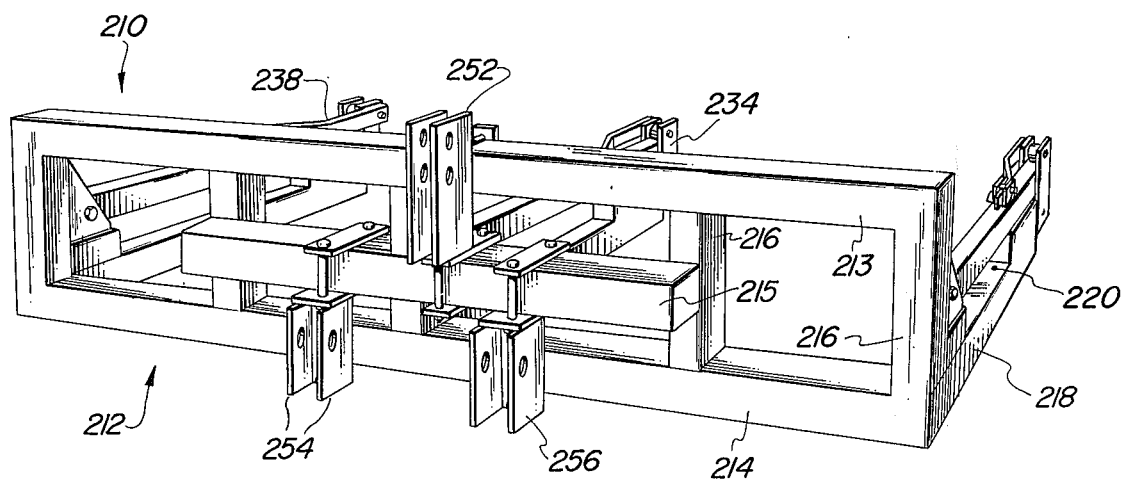
FIG. 9 is a front perspective view of the apparatus shown in FIG. 8.
Figure 10:
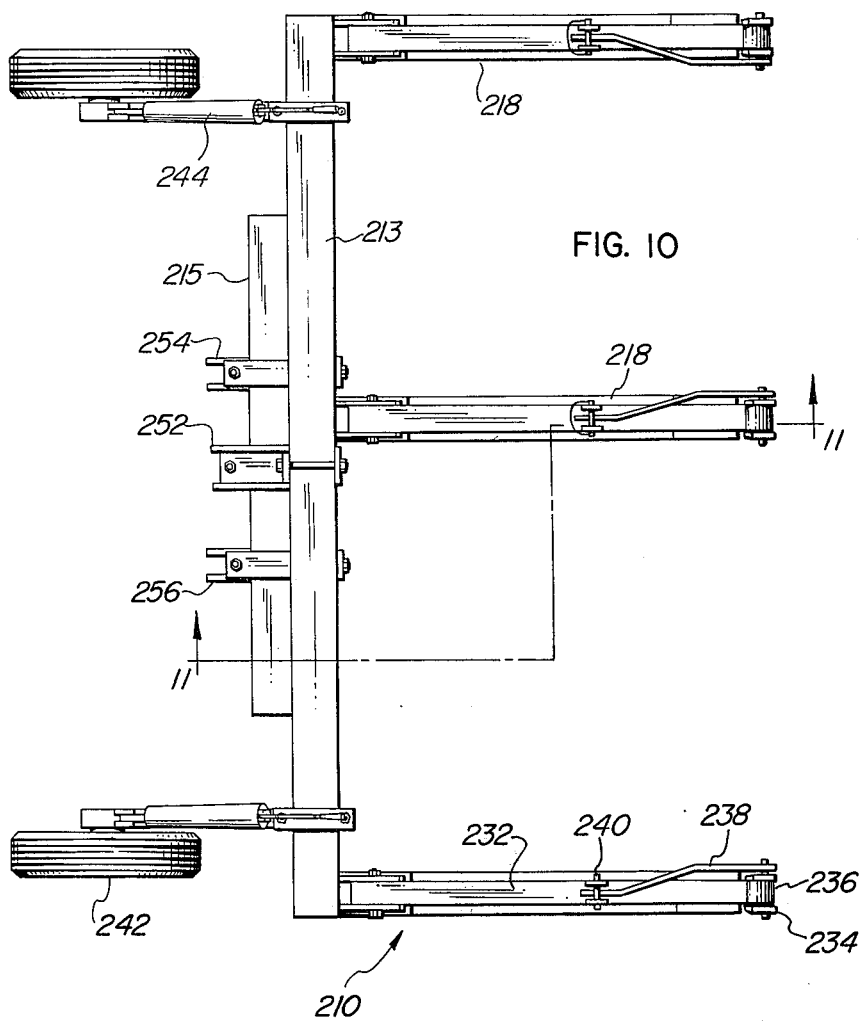
FIG. 10 is a top plan view of the apparatus shown in FIG. 8.
Figure 11:
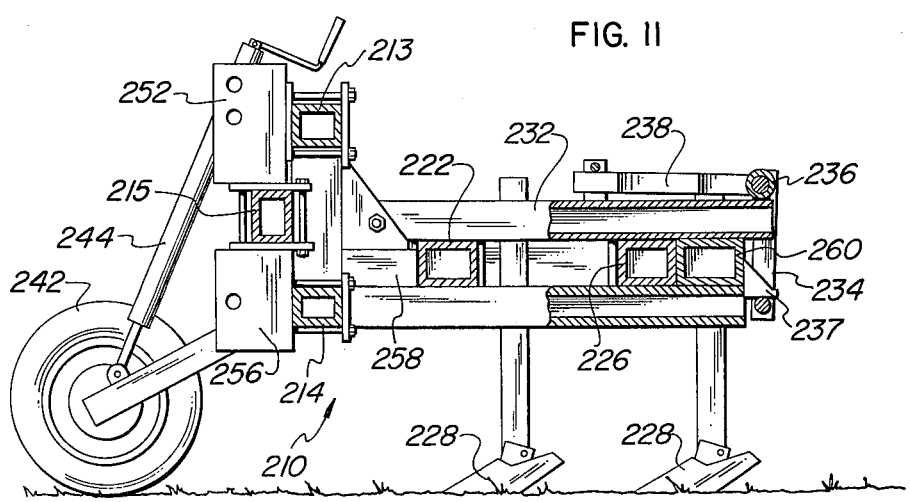
FIG. 11 is a side sectional view of the apparatus shown in FIG. 8 taken substantially on line 11—11 of FIG. 10, with the addition of the tool bar assembly attached in place therein.

The apparatus 210 had forward frame 212 which includes the upper support member 213 and the lower support member 214. These two support members are parallel and connected together by vertical connecting members 216. Upper support member 213 is thus supported vertically above the lower support member 214. As illustrated in FIGS. 8 and 9, there five vertical connecting members 216. In this embodiment, reinforcing member 215 is attached to the center three vertical connecting members 216 approximately half-way between them. E.g., referring to FIG. 11, analysis will indicate that the placing of the reinforcing member 215 forward of the vertical connecting members 216 and, therefore, forward of the support members 213 and 214 across the center of the frame 212 particularly reinforces it and produces an extremely rigid, strong frame in this area. It will be understood that the draft of the tractor T is transmitted through the frame to the tool bars 222. Therefore, this additional reinforcing bar makes it possible to attach a tractor of extremely high horsepower satisfactorily.

Also, the additional reinforcing support memeber 215 aids in the attachment of the frame hitch members. Two plates 252 are attached by backing plates (not clearly seen in the drawings) and then bolted to the upper support member 213 at the back. The two plates 252 are attached by bolts which extend vertically, straddling the reinforcing support member 215. Likewise, each of the plates 254 and 256 are attached together by backing members and then the plates 254 and 256 are attached to the lower support members 214 by bolts straddling them, the bolts extending horizontally and they are also attached to reinforcing support member 215 by vertical bolts straddling it. In this manner, the reinforcing support member 215 is a particular aid in attaching the frame hitch to the frame 212. Those skilled in the art will recognize that the plates 252, 254, and 256, form a frame hitch which readily attaches the standard 3-point hitch on farm tractor T.

Gauge wheels 242 are attached to the frame with the inclusion of adjusting means 244 as in the prior embodiments. Particularly, it is pointed out that with the gauge wheels attached to the frame 212, it is not necessary to have a pair of gauge wheels with each tool bar assembly 221 as in the prior art practice before my invention. The gauge wheels have not been shown in FIGS. 8 and 9 for clarity of illustration.

The support arms 218 extend rearwardly from frame portion 212. As seen in the drawing, the support arms 218, like the arms 18, are cantilevered from the frame. From the foremost edge of the recessed portion, the support arms are unimpeded and free of obstructions so that they may freely pass beneath the tool bar with the tools attached. It will be noted that in this embodiment that there are three support arms and they are not evenly spaced. I.e., the middle support arm is not halfway between the outside two support arms. This is because the middle support arm is offset slightly from the center so it does not interfere with the attachment of the plates 252 of the frame hitch. Also, in certain agricultural practices, the farmer may desire to mount an earthworking tool or plow 228 to the tool bar 222 at the center of the apparatus 210. In that event, it is more convenient to have the center support arm 218 offset to one side. As stated before, the tools 228 are attached to the tool bar 222 by any conventional clamping means 226.

The support arms 218 are attached directly behind the lower support members 214. Each has a block 258 attached as by welding to the forward portion thereof and an another block 260 attached to the rear portion thereof, forming a single recessed portion 220 in which the tool bar assembly 221 is placed by the operation of the power lift of the tractor as described above.

Each locking bar 232 is associated with each support arm 218. The locking bar 232 is conveniently pivoted by a bolt extending between reinforcing gusset 262 which extend from the connecting member 216 to the top of the block 258. The locking bars 232 are held in position by links 234 which are pivoted to the camming pin 236 and operated by handle 238, all as before. The handle 238 is held in the locked position by pin 240 extending through ears on the top of the locking bar 232 rather than by chain as described in previous embodiments. In the lock position, the links 234 engage under lugs 237 welded to the rear of the rear block 260 as illustrated.

Thus, it may be seen that I have provided an apparatus by which a farmer may drop off a tool bar assembly 221 and pick up another tool bar assembly 221 simply and easily. Also, it may be seen that cost of the tool bar assembly 221 may be reduced inasmuch as it is not necessary to attach gauge wheels to each tool bar assembly 221. Also, the tool bar assembly 221 does not have the frame hitch members, these being attached to the frame themselves. Furthermore, once the tool bar assembly 221 is picked up, it is extremely strong and rigid, having the additional reinforcement of the frame 212, which includes the reinforcing support member 215.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

I claim as my invention:

1. In a farm tractor having
   a. a 3-point hitch with
   b. means for raising and lowering the hitch,
   c. The Improved Structure For Attaching Earthworking Tools Thereto Comprising:
   d. a frame
      i. extending laterally and
      ii. attached to said 3-point hitch;
   e. support arms
      i. parallel to one another,
      ii. horizontally oriented,
      iii. having at least one recessed portion in the upper surface of each support arm,
      iv. attached to and extending rearwardly from the frame only, and
      v. each arm unimpeded and free of obstructions from the forward edge of the recessed portion rearward,
   f. a tool bar unit
      i. extending laterally,
      ii. having earth working tools attached thereto, and
      iii. removably seated in the recessed portion of the support arms; and
   g. a locking bar for each support arm
      i. pivoted to the front of its support arm,
      ii. extending over and locking the tool bar unit securely in the recessed portion, and
      iii. latched to the rear of its support bar.

2. The invention as defined in claim 1 with an additional limitation of
   j. gauge wheels attached to said frame.

3. The invention as defined in claim 1 wherein the locking bar is latched to its support bar by
   j. a movable link interconnecting the rearward ends of the locking bar and support arms.

4. The invention as defined in claim 1 with additional limitations of said frame including
   j. a lower support member horizontally and laterally oriented,
   k. an upper support member vertically above and parallel to the lower support member, and
   m. a reinforcing support member forward of and parallel to the lower and upper support members.

5. The invention as defined in claim 4 with an additional limitation of
   n. gauge wheels attached to said frame.

6. The invention as defined in claim 5 wherein the locking bar is latched to its support bar by
   o. a movable link interconnecting the rearward ends of the locking bar and support arms.

7. In farming equipment having
   a. a tractor,
   b. a frame,
   c. a hitch interconnecting the frame and tractor,
   d. means on the tractor for raising and lowering the frame,
   e. at least one laterally extending tool bar, and
   f. earthworking tools on the tool bar;
   g. The Improved Structure for Removably Connecting The Tool Bar To The Frame Comprising:
   h. at least two rearwardly extending, laterally spaced parallel support arms rigidly connected at their forwards ends only to the frame, cantilevered from the frame,
   j. at least one recess in the upper side of each support arm,
   k. said laterally extending tool bar in the recess supported by the support arms,
   m. a locking bar operatively related to each support arm,
   n. each locking bar mounted to the frame for movement to the support arm, and
   o. each locking bar forming means for locking the tool bar into the recess on the support arm,
   p. the rear portion of the frame with the support arms theron being open and unimpeded and free of obstructions,
   g. so that the support arms may be moved under the tool bar with the earthworking tools thereon when mounting the tool bar to the support arms.

8. The invention as defined in claim 7 with an additional limitation of
   r. gauge wheels attached to the frame.

9. The invention as defined in claim 7 with additional limitations of
   r. a second tool bar with earthworking tools thereon in
   s. a second recess in the upper side of each support arm,
   t. said second tool bar also locked in place by said locking bar.

10. The invention as defined in claim 7 with additional limitations of
    r. each of said locking bars pivoted to the frame, and
    s. means on the end of each of the locking bars for retaining the locking bars in the position to lock the support bars in the recess.

11. The invention as defined in claim 10 with an additional limitation of
    t. gauge wheels attached to the frame.

12. The invention as defined in claim 11 with additional limitations of
    u. a second tool bar with earthworking tools thereon in
    v. a second recess in the upper side of each support arm, w. said second tool bar also locked in place by said locking bar.

13. Apparatus for removably supporting an elongated farm tool bar, said apparatus comprising:
   a frame adapted to be secured at its front end to a farm vehicle, said frame comprising a plurality of paralelel rearwardly extending support arms,
   each of said support arms having a recessed portion therein, the recessed portion in one arm being substantially laterally aligned with the recessed portions of the other arms,
   an elongated locking bar movable mounted on said frame adjacent each arm for movement between a locking position adjacent said recessed portion and an unlocking position removed from said recessed portion, and
   means for releasable retaining each locking bar in said locking position, said retaining means comprising movable link means being movable into engagement with the end portions of the adjacent support arm and locking bar when the locking bar is in said locking position, each of said link means comprises movable cam means engaging the adjacent locking bar when in said closed position.

14. The apparatus of claim 13 wherein each of said arms has a plurality of rearwardly spaced recessed portions therein, the recessed portions in one arm being substantially laterally aligned with the recessed portions in the other arms.

15. The apparatus of claim 13 wherein said link means are movably mounted on each of said support arms.

16. The apparatus of claim 13, further comprising gauge wheels attached to said frame.

* * * * *